United States Patent [19]

Dill

[11] 4,444,264

[45] Apr. 24, 1984

[54] METHOD OF USING A DIVERTING MATERIAL FOR WELL TREATMENT

[75] Inventor: Walter R. Dill, Duncan, Okla.

[73] Assignee: Halliburton Company, Duncan, Okla.

[21] Appl. No.: 389,314

[22] Filed: Jun. 17, 1982

[51] Int. Cl.$^3$ ............... E21B 33/138; E21B 43/26; E21B 43/27

[52] U.S. Cl. .................. 166/294; 166/281; 166/282; 166/283

[58] Field of Search ................ 166/281–283, 166/307, 308, 294, 292, 293, 280, 278; 175/65; 252/8.5 A, 8.5 C, 8.5 M, 8.55 R, 8.55 C

[56] References Cited

U.S. PATENT DOCUMENTS

| | | | |
|---|---|---|---|
| 3,153,450 | 10/1964 | Foster et al. | 166/283 |
| 3,319,716 | 5/1967 | Dill | 166/282 |
| 3,374,835 | 3/1968 | Knox | 166/282 |
| 3,455,390 | 7/1969 | Gallus | 252/8.5 C X |
| 3,480,084 | 11/1969 | Eilers | 166/282 |
| 3,658,701 | 4/1972 | McGlothlin et al. | 252/8.5 M X |
| 3,711,405 | 1/1973 | Pye et al. | 252/8.55 C X |
| 3,724,549 | 4/1973 | Dill | 166/282 |
| 3,797,575 | 3/1974 | Dill et al. | 166/282 |
| 3,827,498 | 8/1974 | Crowe | 166/282 |
| 3,845,822 | 11/1974 | Clampitt et al. | 166/281 |
| 4,026,361 | 5/1977 | Knapp et al. | 166/294 X |

FOREIGN PATENT DOCUMENTS

960579 1/1975 Canada ............... 166/282

OTHER PUBLICATIONS

*The Condensed Chemical Dictionary*, Sixth Edition, Reinhold Publishing Co., N.Y., p. 892.

*Primary Examiner*—Stephen J. Novosad
*Attorney, Agent, or Firm*—Robert A. Kent; Thomas R. Weaver

[57] ABSTRACT

The present invention relates to a diverting material or fluid-loss additive for use in subterranean formations penetrated by a well bore comprising graded phthalimide particles. The phthalimide particles are introduced into the formation in a carrier fluid. The carrier fluid can include gelling agents or any of the various salts known to be useful in fluids employed in subterranean formation treatment. The phthalimide particles can be used in elevated temperature oil and gas producing formations.

22 Claims, No Drawings

METHOD OF USING A DIVERTING MATERIAL FOR WELL TREATMENT

BACKGROUND OF THE INVENTION

1. Field of the Invention

The present invention relates to an aqueous and hydrocarbon soluble diverting material or fluid-loss additive and a method for use of the material in the treatment of wells in subterranean formations.

2. Description of the Prior Art

In the treatment of fluid-containing subterranean formations penetrated by a well bore with various treatment fluids, there often is a need to incorporate a material in the treatment fluid which temporarily decreases the permeability of the formation to the treatment fluid. Otherwise, the treatment fluid can pass through existing channels, fissures, and the like in the formation without effecting the desired treatment. For example, when treating a heterogenous permeable formation with an acidizing fluid, it is important to contact the less permeable zones of the formation with acid if desired formation fluid flow is to be improved. Many additives generally known as diverting materials have been developed for this use. Also, when a formation is to be fractured utilizing a fracturing fluid, more efficient treatments can be achieved if the fracturing fluid is not lost to the formation. In these instances, fluid-loss additives are desirable. There also are other treatments where fluid loss control is desirable.

Numerous materials have been utilized as fluid loss additives and as diverting materials. Examples of such materials are disclosed in U.S. Pat. Nos. 3,374,835; 3,480,084; 3,724,549; 3,797,575; 3,827,498; 4,026,361, and the like. However, various problems exist in the use of the different materials. It is desirable that the material be suitable for use as either a fluid-loss additive or a diverting material, be stable in acidic solutions, and be easily removed from the formation subsequent to the treatment. Also, it is desirable that the material be able to pass through a gravel or sand pack so as to permit effective treatment of the formation located behind the pack.

SUMMARY OF THE INVENTION

The discovery now has been made that the material of the present invention can be utilized as a diverting material or a fluid-loss additive in the treatment of subterranean formations with various treatment fluids. The novel material of the present invention is stable in aqueous acidic solutions and is soluble in aqueous and hydrocarbon solutions. The diverting material or fluid-loss additive of the present invention comprises phthalimide. The diverting material or fluid-loss additive of the present invention is suitable for use in oil or gas wells over a wide temperature range.

DESCRIPTION OF THE PREFERRED EMBODIMENT

The present invention provides a diverting material for diverting aqueous treating fluids, including acids, into progressively less permeable portions of a subterranean formation. The present invention also provides a fluid-loss additive for reducing the fluid loss to the formation of an aqueous or hydrocarbon treating fluid utilized, for example, in fracturing treatments. The use of the material of the present invention as a diverting material or fluid-loss additive merely is a matter of the particle size of the material utilized. The invention provides a material that will withstand high formation temperatures and which can be readily removed from the formation by dissolution in the produced fluids or by sublimation at the more elevated temperatures. The invention also provides a material which is compatible either with other formation permeability-reducing materials or permeability-increasing materials.

The material of the present invention comprises phthalimide particles. The phthalimide can be transported in an aqueous or hydrocarbon carrier fluid. The purpose of the phthalimide particles in the carrier fluid is to seal off portions of a subterranean formation by blocking off the fissures, pores, channels, vugs, and the like which grant access to the formation from the well bore penetrating the formation. It has been discovered that particles of a uniform size may bridge across an opening into the well bore but not operate to stop the flow of fluid into the formation from the well bore. However, it has been found that particles of a graded size will operate to bridge across an opening and seal the formation sufficiently to divert the treatment fluid to other areas in the well bore. Thus, to be useful in the present invention, it is preferred that the phthalimide be present in a graded particle size distribution.

The particle size distribution of the phthalimide may be graded from about 4 mesh to about 200 mesh of the U.S. Sieve Series. The particle size of the phthalimide particles when used as a diverting material should vary sufficiently that there is at least about 8 mesh sizes difference between the smallest and largest sizes present within the overall range. Preferably, at least about 15 percent of the particles will have a particle size finer than about 60 mesh. The particle size of the phthalimide particles when used as a fluid-loss additive should vary sufficiently that there is at least about 4 mesh sizes difference between the smallest and largest sizes present within the overall range. Preferably, at least about 50 percent of the particles will have a size less than about 100 mesh.

The phthalimide generally has some solubility in the carrier fluid and the solubility increases with increasing temperature. Thus, to be effective the phthalimide must be present in an amount sufficient to saturate the carrier fluid and still provide the desired concentration of solid particles at the temperature of the zone to be treated in the subterranean formation. The phthalimide should be present in the carrier fluid in an amount sufficient to provide a concentration of undissolved particles of from about 0.01 pound to about 2.0 pounds per gallon of carrier fluid. More particularly when the phthalimide particles are used as a diverting agent, for example, in a limestone formation, the phthalimide should be present in an amount sufficient to provide a concentration of undissolved particles of from about 0.25 pound to about 2 pounds per gallon of carrier fluid. Preferably, the concentration would be about 1.0 pound per gallon of carrier fluid. When phthalimide particles are to be used as a fluid-loss additive or diverting agent in sandstone formations, the concentration of undissolved particles should be in the range of from about 0.005 pound to about 0.3 pound per gallon of carrier fluid. Preferably, the concentration is in the range of from about 0.01 pound to about 0.1 pound per gallon of carrier fluid. When phthalimide is used as a fluid-loss aid, for example in combination with another conventionally known fluid-loss additive such as silica flour or an oil-soluble resin, a concentration of from about 0.1 pound to about 0.3 pound per gallon of carrier fluid generally is satisfactory.

When it is desired to reduce the quantity of phthalimide dissolved in the carrier fluid, a gelling agent, a salt or a combination of the same can be admixed with the fluid prior to addition of the phthalimide particles. The gelling agent can be any one or more of the liquids or solids known to impart increased viscosity and suspending properties to the various carrier fluids and which does not adversely react with either the treatment fluid or phthalimide. The gelling agent for aqueous carrier fluids can comprise, for example, polymers such as gums, celluloses, polysaccharides, polyacrylamides, alkoxylated amines and the like. The gelling agent for hydrocarbon carrier fluids can comprise, for example, a combination of octylphosphate ester and a basic metal salt.

The selection and amount of gelling agent, if present, should be such as to increase the viscosity of the carrier fluid by at least about 10 centipoise and preferably from about 30 to 60 centipoise. An amount of from about 0.2 to about 0.9 percent by weight of the carrier fluid normally is sufficient for most gelling agents. The limit of the amount of gelling agent that is used merely is one of practical limits. The limit being the concentration at which the viscosity of the carrier fluid is too great to permit effective transport of the fluid into the formation. An additional benefit of the use of a gelling agent is the improved ability of the viscous fluid to transport the phthalimide particles into the formation without settling.

Salts which can be employed are any of those known by individuals skilled in the art that do not adversely react with the phthalimide or formation, such as for example sodium chloride, potassium chloride or the like. The addition of the salts increase the specific gravity of the carrier fluid which also improves the particle transport properties of the carrier fluid and decreases the solubility of the phthalimide particles in the carrier fluid.

The combination of gelling agents and salts should be considered to achieve minimum phthalimide solubility and maximum improvement in the transport properties.

The phthalimide particles can be admixed with the carrier fluid and introduced into the well bore at intervals between stages of a treatment or as a pretreatment. Alternatively, if the carrier fluid and treatment fluid are the same, the phthalimide particles can be added continuously as the treating fluid is pumped into the well bore. For example, in fracturing treatments, it is desirable that the diverting material or fluid-loss additive be added to the fracturing treatment fluid in slugs. Fracturing fluids are known to preferentially flow into the portion of the subterranean formation which most readily accepts the fluid. After the portion of the subterranean formation is fractured, the diverting material or fluid-loss additive can be introduced into the formation to substantially plug the previously fractured portion of the formation. Because the carrier fluid of the diverting material or fluid-loss additive also will preferentially flow to the region of highest permeability, that is the fracture, the carrier fluid will transport the diverting agent or fluid-loss additive with it. The fractured zone then is plugged and the subsequently introduced fracturing fluid is diverted to the next most permeable portion of the formation.

In acidizing treatments, the diverting material may be added continuously to the treating fluid as that fluid is pumped into the well bore. Alternatively, the diverting material may be added at intervals in a carrier fluid between stages of the acidizing treatment. When the diverting material is added continuously, the diverting material will progressively plug portions of the formation being treated, thereby avoiding the tendency of the acid to flow only into the most permeable portions of the formation and instead, creating an evenly acidized formation. When the acidizing fluid is pumped in stages, the first stage is followed by a quantity of the diverting material in a carrier fluid which may be gelled or emulsified. The diverting material seals off the portion of the formation penetrated by the first stage of acidizing fluid. The second stage of acidizing fluid then is pumped into another portion of the formation. Alternating stages of treating fluid and diverting material may be continued to provide a uniformly acidized formation.

The phthalimide particles comprising the diverting material or fluid-loss additive may be removed from the subterranean formation by dissolution in the produced formation fluids or by flushing the formation with a fluid to dissolve the phthalimide. The phthalimide has a high melting point temperature. The melting point is in the range of from about 442° F. to about 464° F.; however, the phthalimide begins to sublime at temperatures near to and above 250° F. These properties are particularly useful in the treatment of high temperature gas wells wherein it is desirable to minimize the quantity of liquids introduced into the formation. The phthalimide particles generally will not melt in the formation and the phthalimide subsequently can be removed by sublimation. This avoids the injection of additional quantities of liquids into the formation to dissolve the diverting material or fluid-loss additive.

The following examples illustrate the various beneficial effects of the diverting material or fluid-loss additive of the present invention. The examples are provided for purposes of illustration only and are not to be considered as limiting the invention only to the specific aspects described therein.

EXAMPLE I

Diverting tests are performed to compare the effectiveness of phthalimide particles with benzoic acid particles. The carrier fluid is fresh water gelled with 80 pounds of hydroxypropylguar per 1,000 gallons of water. Sufficient phthalimide is admixed with a portion of the carrier fluid to provide a concentration of about 2 pounds of particles per gallon of fluid. Sufficient benzoic acid is admixed with another portion of the carrier fluid to provide a concentration of about 2 pounds per gallon of fluid. The benzoic acid is of the form which is commercially available. The phthalimide particles and benzoic acid have a sieve analysis as set forth in Table I, below.

TABLE I

| Sieve Size U.S. Standard Mesh | Percent of Particles | |
|---|---|---|
| | Phthalimide | Benzoic Acid |
| +4 | 4.6 | 13.2 |
| −4 + 20 | 54.9 | 81.3 |
| −20 + 60 | 19.0 | 5.3 |
| −60 | 21.5 | 0.2 |

The samples of carrier fluid are introduced into a simulated zone comprising 8–12 mesh angular sand. The cross-sectional area of the simulated zone is 4.9 square inches. The samples of carrier fluid are introduced at various pressures into the simulated zone. The diverting material is permitted to bridge and the stabilized flow through the zone is measured. After stabilized flow is achieved in Test No. 1, the pressure is increased to the levels set forth in Tests 2 and 3, respectively, from the immediately preceeding pressure level and the stabilized flow through the zone is measured at each successive pressure level. The results of these tests are set forth in Table II, below.

TABLE II

| Test No. | Diverting Material | Pressure (psi) | Spurt Loss, (mls.) | Stabilized Flow (mls./min.) |
|---|---|---|---|---|
| 1 | Phthalimide | 100 | 170 | 10 |
| 2 | Phthalimide | 500 | — | 10 |
| 3 | Phthalimide | 1,000 | — | 10 |
| 4 | Benzoic Acid | 100 | — | 272 |

The results of the tests set forth in Table II clearly illustrate the effectiveness of phthalimide as a diverting material or fluid-loss additive.

EXAMPLE II

Diverting tests are performed with ground phthalimide particles on sandstone. Sufficient phthalimide of various particle sizes is admixed with a 15 percent HCl solution which contains 0.5 percent by volume of an amphoteric surfactant to provide several samples of different concentrations. The samples are passed through a sand column (Oklahoma No. 1, 9 darcy permeability) one inch high having a surface area of 0.625 square inches. The flow of carrier fluid is measured while a bridge forms and after formation at 80 psi and a temperature of 76° F. The results of the tests are set forth in Table III, below.

TABLE III

| Sample No. | Concentrations of Phthalimide Particles (lbs./1,000 gallons) | Phthalimide Particle Size Range, μ | Average Particle Size, μ | Flow While Bridge Formed, (ml.) | Flow Thru Bridge, (ml/min) |
|---|---|---|---|---|---|
| 1 | 20 | 7–70 | 18 | 43 | 17 |
| 2 | 20 | 3–40 | 10 | 22 | 8 |
| 3 | 20 | 3–30 | 8 | 24 | 20 |
| 4 | 40 | 3–40 | 10 | 20 | 8 |
| 5 | 40 | 3–30 | 8 | 20 | 18 |

The results of these tests clearly illustrate the effectiveness of phthalimide particles in a size range of from about submicron to about 40 microns having an average particle size of about 10 microns for sandstone diverting.

While preferred embodiments of the present invention have been described for purposes of disclosure, it is to be understood that the description and foregoing examples are presented to illustrate and explain the invention and suitable variations may be made within the scope of the appended claims without departing from the spirit or scope of the invention.

What is claimed is:

1. A method of diverting formation treating fluids to less permeable portions of a subterranean formation which comprises the steps of:
   pumping into said formation a composition which comprises: a carrier fluid, and graded phthalimide particles, said particles being present in a suitable particle size range and in an amount sufficient to divert a formation treating fluid to a less permeable portion of said formation.

2. The method of claim 1 wherein said carrier fluid is selected from the group consisting of water, aqueous acid solutions, hydrocarbons, alcohols, aqueous alcohols, hydrocarbon-in-water emulsions, water gelled with gums, cellulose, polysaccharides, or polyacrylamides, and acids gelled with gums, cellulose, polysaccharides, or polyacrylamides.

3. The method of claim 1 wherein said phthalimide is present in a particle size in the range of from about 4 to about 200 mesh on the U.S. Sieve Series.

4. The method of claim 1 wherein said phthalimide particles are present in a concentration of from about 0.01 pound to about 2 pounds per gallon of carrier fluid.

5. The method of claim 1 wherein said formation treating fluid is the carrier fluid.

6. The method of claim 1 wherein said composition is pumped continuously into said subterranean formation.

7. The method of claim 1 wherein said composition is pumped intermittently into said subterranean formation.

8. The method of treating a subterranean formation penetrated by a well bore, wherein fluid loss to the formation is excessive, employing a formation treating fluid comprising pumping down the well bore into said formation a composition which comprises a carrier fluid and phthalimide particles, said phthalimide particles being present in a particle size in the range of from about 4 to 200 mesh on the U.S. Sieve Series and in an amount of from about 0.01 pound to 2.0 pounds per gallon of carrier fluid.

9. The method of claim 8 wherein said composition is pumped continuously into said subterranean formation.

10. The method of claim 8 wherein said composition is pumped intermittently into said subterranean formation.

11. The method of claim 8 wherein said formation treating fluid is the carrier fluid.

12. The method of claim 8 wherein said phthalimide particles are present in an amount of from about 0.01 pound to about 0.3 pound per gallon of carrier fluid.

13. The method of claim 8 wherein about 50 percent of the phthalimide particles present have a particle size less than about 100 mesh.

14. A method for diverting formation treating fluids to less permeable portions of a subterranean sandstone formation penetrated by a well bore which comprises the steps of:
   pumping into said formation a composition which comprises:
      a carrier fluid, and
      graded phthalimide particles having a particle size in the range of from about submicron to about 40 microns in an amount sufficient to divert a formation treating fluid to a less permeable portion of said formation.

15. The method of claim 14 wherein the well bore contains a gravel pack having a particle size of from about 40–60 mesh on the U.S. Sieve Series or coarser.

16. The method of claim 15 wherein the phthalimide particles have an average particle size of about 10 microns.

17. The method of claim 16 wherein said phthalimide particles are present in an amount of from about 0.01 pound to about 0.1 pound per gallon of carrier fluid.

18. The method of claim 15 wherein said phthalimide particles are present in an amount of from about 0.005 pound per gallon to about 0.3 pound per gallon of carrier fluid.

19. The method of claim 14 wherein the well bore contains a sand pack having a particle size of from about 40-60 mesh on the U.S. Sieve Series or coarser.

20. The method of claim 19 wherein the phthalimide particles have an average particle size of about 10 microns.

21. The method of claim 20 wherein said phthalimide particles are present in an amount of from about 0.01 pound to about 0.1 pound per gallon of carrier fluid.

22. The method of claim 19 wherein said phthalimide particles are present in an amount of from about 0.005 pound per gallon to about 0.3 pound per gallon of carrier fluid.

* * * * *